US008165735B2

(12) United States Patent
Constans

(10) Patent No.: US 8,165,735 B2
(45) Date of Patent: Apr. 24, 2012

(54) METHOD AND DEVICE FOR DETERMINING AN AIRCRAFT LANDING DELAY MARGIN

(75) Inventor: Florian Constans, Reidisheim (FR)

(73) Assignee: Airbus Operations SAS, Toulouse (FR)

( * ) Notice: Subject to any disclaimer, the term of this patent is extended or adjusted under 35 U.S.C. 154(b) by 1037 days.

(21) Appl. No.: 12/062,073

(22) Filed: Apr. 3, 2008

(65) Prior Publication Data
US 2008/0300741 A1    Dec. 4, 2008

(30) Foreign Application Priority Data

Apr. 4, 2007    (FR) ..................................... 07 54271

(51) Int. Cl.
*G60G 7/70*    (2006.01)

(52) U.S. Cl. .............................. 701/15; 244/183; 701/18

(58) Field of Classification Search .................... 701/15, 701/16, 18; 244/183
See application file for complete search history.

(56) References Cited

U.S. PATENT DOCUMENTS

| 4,454,582 | A | 6/1984 | Cleary et al. | |
|---|---|---|---|---|
| 4,750,127 | A * | 6/1988 | Leslie et al. | ..................... 701/16 |
| 7,068,187 | B2 * | 6/2006 | Ishihara et al. | ............... 340/951 |
| 7,085,630 | B2 * | 8/2006 | Ryan et al. | ....................... 701/16 |
| 7,916,042 | B2 * | 3/2011 | Constans | ...................... 340/945 |
| 2004/0167685 | A1 | 8/2004 | Ryan et al. | |
| 2009/0048724 | A1 * | 2/2009 | Caule | .............................. 701/16 |

FOREIGN PATENT DOCUMENTS

WO    2006137937 A1    12/2006

* cited by examiner

*Primary Examiner* — Eric Culbreth

(74) *Attorney, Agent, or Firm* — Perman & Green, LLP

(57) ABSTRACT

A method to assist in the landing of an airplane in its final flight phase, following a current approach path toward a runway, includes determining at a given flight point, a landing delay margin, called MRAmax, corresponding to an estimated delay during which the braking actions must be undertaken, after the wheels touch down, to enable the airplane to stop on the runway. A device includes equipment for acquiring parameters necessary to perform the method of assisting the landing of the airplane, a computer to determine the landing delay margin MRAmax from the parameters, and a display for presenting the information to alert the crew.

7 Claims, 2 Drawing Sheets

METHOD AND DEVICE FOR DETERMINING AN AIRCRAFT LANDING DELAY MARGIN

BACKGROUND

1. Field

The disclosed embodiments relate to the field of airplane piloting assistance. More particularly, the invention relates to a method and a device for improving the piloting quality and the safety of the airplane during the final phase of a flight with a view to a landing by providing the pilots with information enabling them to decide on whether to continue or interrupt a landing procedure.

2. Brief Description of Related Developments

The final flight phase of an airplane normally breaks down into three phases:

an approach phase, during which the airplane approaches the runway, a leveling-off phase ending with the airplane touching down on the ground, and an airplane taxiing phase on the runway.

The final flight phase is a difficult phase from a piloting point of view. A large proportion of all incidents occurs on landing. Among the incidents that can occur, longitudinal departures of the airplane from the runway are frequently observed.

These incidents on landing pose safety problems for the airplane and its occupants but also for the other users of the airport, and generate air traffic level difficulties involving delays, diversions. Even in the most minimal cases, following a runway departure, the airplane must be grounded for a detailed inspection and any repairs, for example a replacement of the landing gear. Furthermore, even without any impact on safety or on the integrity of the airplane, such incidents are ill-perceived by the passengers and affect the image of the manufacturer and of the operator of the airplane.

These incidents can more often than not be explained by the combination of several aggravating factors which degrade performance levels on landing, such as, for example:

the state of the runway (wet, covered with snow, etc.), the presence of unfavorable wind, mainly a tail wind, an inappropriate leveling-off piloting technique that can involve the wheels touching down a long way after the runway threshold, a sequence of braking actions that is too slow or delayed.

Each unfavorable factor and their accumulations can culminate in a reduction of the safety margin of the airplane on landing, even a negative margin. In practice, it is not easy for the crew to fairly estimate the actual safety margin regarding the risk of longitudinal departure from the runway, because of the difficulty in assessing distances when the height is low. However, if the crew had had a better awareness of the situation relative to the safety margin during the approach phase, in many cases, it would have been able to decide on a go-around and incidents could have been avoided.

The U.S. patent published under the U.S. Pat. No. 7,068,187 proposes a method for assisting the crew of an airplane in a go-around decision. Many parameters, such as, for example, the deceleration required to stop the airplane on the runway after the wheels have touched down, the wind conditions on the runway, or the speed of the airplane, etc. are monitored during the approach phase in order to detect the conditions leading to a possible runway departure, and a risk level is assessed. When the risk exceeds a certain threshold, an alert is given to warn the crew of a need for a go-around.

However, the method described in this patent does not enable the crew to estimate the maneuvering margin at any instant and the speed of the actions to be completed after the wheels of the airplane touch down in order to enable said airplane to stop on the runway.

There is therefore an interest in informing the crew as early as possible as to the possibility or impossibility of landing on a runway and the speed with which the actions after the wheels touch down must be performed in order to guarantee that the airplane will stop before the end of the runway.

SUMMARY

The disclosed embodiments propose a method and a device to assist in the landing of an airplane in the final phase of a flight of an airplane, with a view to a display to assist the pilot in making an appropriate decision and so improve the piloting quality and the safety of the airplane.

According to one aspect of the disclosed embodiments, the method to assist in the landing of an airplane in the final approach phase, maneuvering from a position, called current position $P_{av}$, located at a height $H_{av}$ relative to a reference point and with a speed $V_{av}$ following a current approach path towards a threshold of a runway, said runway having an end opposite the threshold on a runway axis (OX), originating from the threshold and positively oriented towards the end, comprises the determination, at a given flight point, of a landing delay margin, called $MRA_{max}$, said landing delay margin corresponding to an estimated delay during which the braking actions must be undertaken, after the wheels touch down, to enable the airplane to stop before the end of the runway.

The landing delay margin $MRA_{max}$ is defined as the time taken by the airplane to travel, at a speed $V_{touch}$ equal to an estimated speed of the airplane at the time when the wheels of said airplane touch the runway, a distance equal to a distance between an estimated stopping point $M_{stop}$ of abscissa $X_{stop}$, corresponding to the possible stopping point of the airplane closest to the runway threshold, and the end of the runway.

Advantageously, during a first phase, called approach phase, i.e. when the current height $H_{av}$ of the airplane is greater than a start-of-leveling-off reference height $H_1$, the abscissa $X_{stop}$ of the stopping point $M_{stop}$ is determined by estimating an abscissa $X_1$ of a point $P_1$, corresponding to the point of the current path at which the airplane would be situated, with a reference start-of-leveling-off speed $V_1$, when said airplane reaches said height $H_1$, to which is added a landing distance $L_o$, dependent on the landing conditions but independent of the current flight parameters $H_{av}$ and $V_{av}$.

Preferably, in this approach phase, the abscissa $X_1$ is determined from the maximum possible total energy variation of the airplane according to the distance traveled by said airplane relative to the ground and the landing distance $L_o$ is estimated from data corresponding to a performance manual of the airplane. Preferably, the speed $V_{touch}$ of the airplane is taken to be equal to $V_1$.

Advantageously, during a second phase, called leveling-off phase, i.e. when the current height $H_{av}$ of the airplane is less than a reference start-of-leveling-off height $H_1$, the abscissa $X_{stop}$ of the stopping point $M_{stop}$ is determined by estimating an abscissa $X_2$ of a theoretical point of impact $P_2$ of the airplane on the runway, to which is added a taxiing distance $L_r$ on the runway.

Preferably, based on the knowledge of the flight parameters of the airplane during this leveling-off phase, the abscissa $X_2$ of the theoretical point of impact $P_2$ of the airplane on the runway is determined as the point of contact of the airplane with the runway assuming, at each instant, a slope of the path at the point $P_{av}$, defined by the tangent to said path at the point $P_{av}$, that is constant until impact.

The taxiing distance $L_r$ is determined from an initial taxiing distance at constant speed and a braking distance $L_f$ determined from the braking capabilities of the airplane on the runway assuming a constant deceleration until the airplane stops. Preferably, the speed $V_{touch}$ of the airplane is taken to be equal to $V_{av}$.

In the exemplary embodiment of the method described, the estimated landing delay margin $MRA_{max}$ corresponds to the maximum value that can be reached by optimum piloting.

In another exemplary embodiment of the method, a current landing delay margin $MRA_{current}$, corresponding to a landing delay margin calculated from the current parameters of the airplane assuming said current parameters be constant until the landing, is calculated at each instant.

Advantageously, in order to estimate whether the landing and the stopping before the end of the runway can be achieved or not, the two landing delay margins $MRA_{max}$ and $MRA_{current}$ are compared to a reference landing delay margin $MRA_{ref}$.

Preferably, an alarm is triggered when the current landing delay margin $MRA_{current}$ is less than said reference landing delay margin $MRA_{ref}$ and/or the landing delay margin $MRA_{max}$ is less than said reference landing delay margin $MRA_{ref}$.

The invention also relates to a device to assist in the landing of an airplane in its terminal flight phase on a runway comprising:

means of acquiring parameters characteristic of an airplane, of the flight and of a landing environment, computation means, which determine, notably from the parameters received from the acquisition means, a landing delay margin $MRA_{max}$, corresponding to an estimated delay during which the braking actions must be undertaken, after the wheels touch down, to enable the airplane to stop on the runway, said landing delay margin $MRA_{max}$ being representative of a maximum value that can be reached with optimum piloting, means of presenting information characterizing the landing delay margin $MRA_{max}$.

Preferably, the information presentation means comprise means of displaying information representative of the landing delay margin $MRA_{max}$ calculated by the computation means.

Preferably, the information presentation means comprise alert means for presenting an alert signal when the landing delay margin $MRA_{max}$ is less than a reference landing delay margin $MRA_{ref}$.

In an embodiment, the alert means generate an audible signal in the airplane cockpit.

In another embodiment, the alert means generate a visual signal in the airplane cockpit.

Preferably, the computation means also determine a current landing delay margin $MRA_{current}$, representative of a landing delay margin calculated, at each instant, on the basis of the current parameters of the airplane assuming said current parameters to be constant until the landing.

BRIEF DESCRIPTION OF THE DRAWINGS

The detailed description of the invention is given with reference to the figures which represent.

DETAILED DESCRIPTION OF THE DRAWINGS

The method according to one aspect of the disclosed embodiments comprises preparing, for the attention of a crew of an airplane 1, during a final flight phase of said airplane, the information enabling said crew to determine, at any moment, a decision parameter, consisting of a landing delay margin, called $MRA_{max}$, the value of which is characteristic of the capabilities of the airplane to land and to stop on a given runway.

The landing delay margin $MRA_{max}$ corresponds to an estimation of a delay in which, after the wheels touch down, braking actions must be undertaken to guarantee that the airplane stops on the runway.

Expressing the landing delay margin in the form of a delay presented to the crew is particularly advantageous because time is a parameter that is particularly tangible and easy to take into consideration by a human operator, at least in the time scales concerned, that is, of the order of a few seconds.

According to one application of the method, said estimated landing delay margin $MRA_{max}$ is communicated to the crew of the airplane, and preferably compared to a reference landing delay margin, called $MRA_{ref}$, for which the landing of the airplane is possible without departing from the runway.

Figure 1:
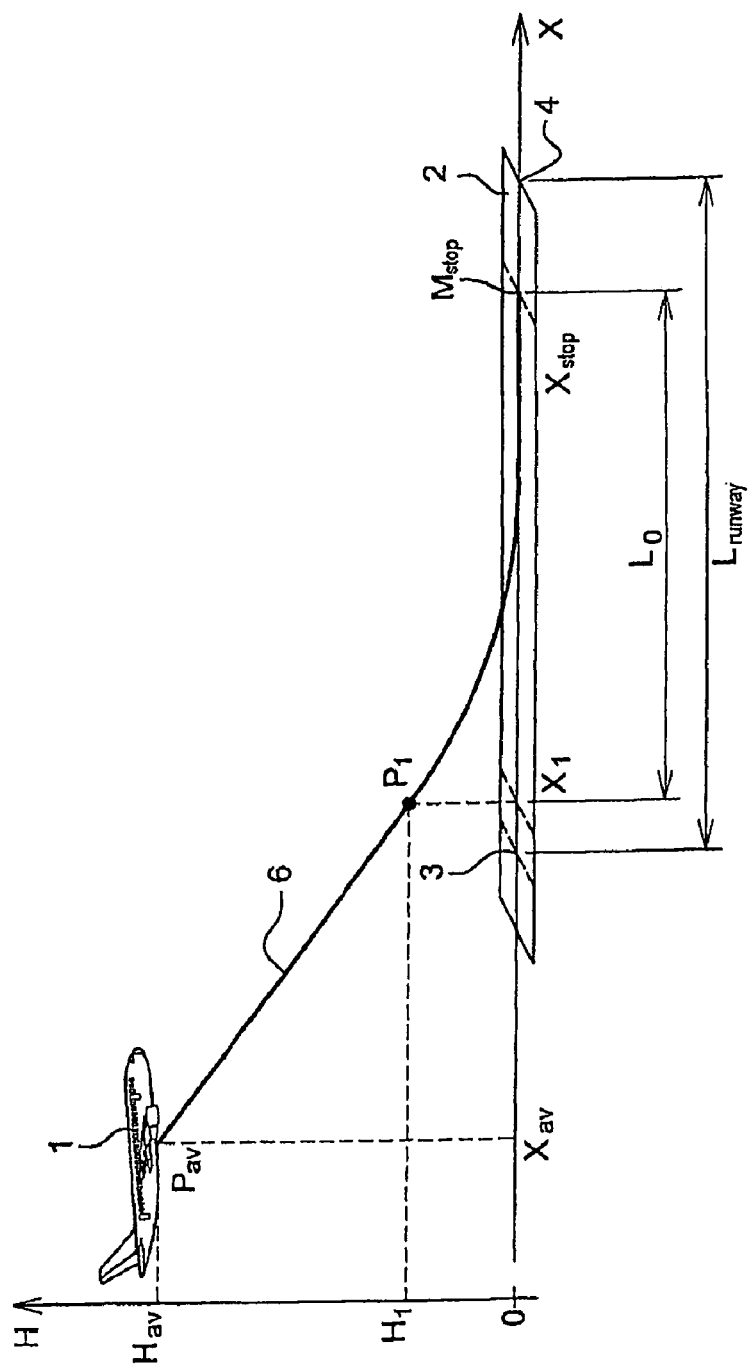
FIG. 1, a diagram illustrating the method according to the invention, when the height of the aircraft is greater than a reference height, FIG. 2, a diagram illustrating the method according to the invention, when the height of the aircraft is less than a reference height, FIG. 3, a theoretical diagram of a device for implementing the method according to the invention.
Figure 2:
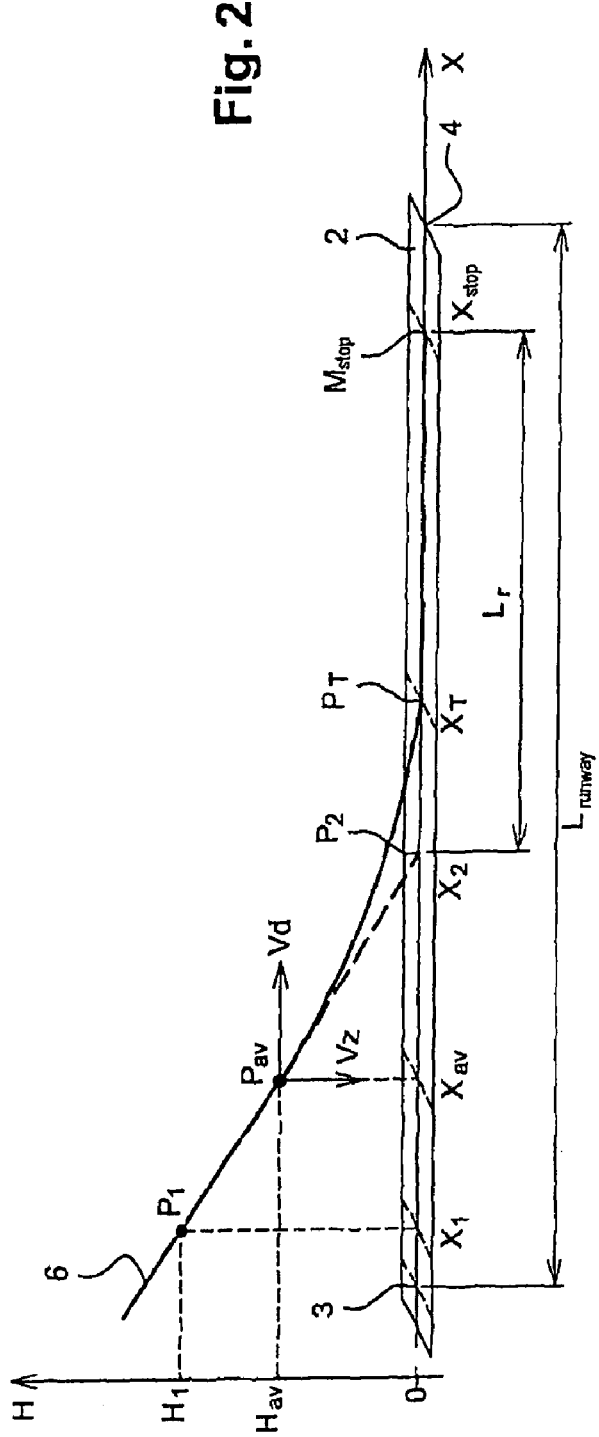

FIGS. 1 and 2 diagrammatically show a runway 2, comprising a runway threshold 3, an end 4 opposite said threshold on a horizontal runway axis (OX) and of maximum length $L_{runway}$ between the threshold 3 and the end 4. By convention, the horizontal runway axis (OX), roughly corresponding to an axis of the runway 2 and having an origin arbitrarily fixed, for example, at the runway threshold 3, is positively oriented in the direction of the planned landing. According to this choice, a value X is negative before the runway threshold 3, zero at the runway threshold 3 and positive beyond the runway threshold 3, and increases in the direction of movement of the airplane on the approach and landing path.

In one exemplary implementation of the method, an abscissa $X_{stop}$ of a stopping point $M_{stop}$ of the airplane 1 on the runway 2 is determined initially, then the landing delay margin $MRA_{max}$ is determined. This choice is not, however, limiting and the value of the landing delay margin $MRA_{max}$ can be calculated according to other methods culminating in a value that is roughly identical or very close to a landing delay margin value $MRA_{max}$.

According to the method, initially, the abscissa $X_{stop}$ of the stopping point $M_{stop}$ of the airplane 1 on the runway 2 is determined.

During this first step, two airplane flight phases are distinguished:

a first flight phase, called approach phase, when the airplane is located above a point, called start point $P_1$, a second flight phase, called leveling-off phase, when the airplane is located below the start point $P_1$.

The start point $P_1$ corresponds to the point of the current path 6 at which the airplane is located when said airplane reaches a reference height $H_1$ for which the leveling-off must begin.

In the approach phase, the slightest change to the flight parameters at the point $P_1$ is reflected in a strong dispersion at the leveling-off level, and therefore an accurate calculation of the effect of the leveling-off on the abscissa $X_{stop}$ of the stopping point $M_{stop}$ is of lesser interest during this approach phase since the flight parameters at the point $P_1$ are not yet known. From the point $P_1$, when the airplane 1 is in the leveling-off phase, the knowledge of the flight parameters makes it possible to estimate relatively accurately an abscissa $X_2$ of a point of impact $P_2$ on the runway 2.

Consequently, the method, during this first step, takes into account these differences and estimates an abscissa $X_{stop}$ of the position of the stopping point $M_{stop}$ in a different way depending on whether the airplane is in approach phase or its leveling-off phase.

When the airplane 1 is in the approach phase, the first step of the method consists in determining the abscissa $X_{stop}$ of the estimated stopping point $M_{stop}$ of the airplane 1 on the runway 2 from the calculation of a maximum variation of the total energy of the airplane 1.

During the approach phase to the runway 2, the airplane 1 maneuvers from a current point $P_{av}$, of abscissa $X_{av}$, at a current height $H_{av}$, greater than $H_1$, and with a current speed $V_{av}$ along the current approach path 6.

The airplane 1 on the current path 6 at said point $P_{av}$, at said height $H_{av}$, and at said speed $V_{av}$, has a total energy $E_{Tav}(X_{av})$ equal to:

$$E_{Tav}(X_{av}) = \frac{1}{2}mV_{av}^2(X_{av}) + mgH_{av}(X_{av}) \tag{1}$$

m being the mass of the airplane at the time of the approach phase, and g being the acceleration of the field of gravity.

According to the procedures defined by the flight regulations, the leveling-off phase, which follows the approach phase, should begin at the reference height $H_1$, which defines the start point $P_1$, of abscissa $X_1$, with a reference speed $V_1$.

Therefore, when the airplane is at the start point $P_1$, at said reference height $H_1$ and at said reference speed $V_1$, its total energy $E_{Tav}(X_1)$ is equal to:

$$E_{Tav}(X_1) = \frac{1}{2}mV_1^2(X_1) + mgH_1(X_1) \tag{2}$$

The total energy variation $dE_{av}$ of the airplane 1 between the points $P_{av}$ and $P_1$ is therefore equal to:

$$dE_{av} = \frac{1}{2}m(V_{av}^2 - V_1^2) + mg(H_{av} - H_1) \tag{3}$$

Furthermore, from the equations of the mechanics of the flight of the airplane, a coefficient K, reflecting the maximum possible total energy loss for said airplane, is determined according to the horizontal ground distance traveled, between the abscissas $X_{av}$ and $X_1$:

$$dE_{av} = K(X_1 - X_{av}) \tag{4}$$

Generally, for most airplanes, during the approach phase, the aerodynamic configuration, therefore the drag coefficient of the airplane, is fixed and the maximum possible total energy loss corresponds to the case where the engines of the airplane deliver a minimum thrust.

The abscissa $X_1$ of the start-of-leveling-off point $P_1$ of the airplane is then equal to:

$$X_1 = X_{av} + \frac{dE_{av}}{K} \tag{5}$$

From said value of the abscissa $X_1$ of the start-of-leveling-off point $P_1$ of the airplane 1, the abscissa $X_{stop}$ of the estimated stopping point $M_{stop}$ of the airplane 1 on the runway 2 is determined by adding, to said value $X_1$, a landing distance $L_o$ corresponding to the leveling-off phase and to the taxiing phase on the runway. Said landing distance $L_o$ corresponds to the landing length established from the airplane flight manual, notably as a function of the mass of the airplane, of a speed deviation relative to a reference speed, of a longitudinal wind, of the state of the runway and of the altitude of the runway. The landing distance $L_o$ is independent of the current flight parameters $H_{av}$ and $V_{av}$. The flight manual is an official document associated with the airplane, giving the performance characteristics of the airplane in the form of charts or in the form of equations.

The abscissa $X_{stop}$ of the stopping point $M_{stop}$ of the airplane 1 on the runway 2 is estimated during the approach phase by the relation:

$$X_{stop} = X_{av} + \frac{dE_{av}}{K} + L_o, \tag{6}$$

where $L_o$ is obtained from the flight manual or from airplane performance calculations.

Thus, the calculation of the maximum variation of the total energy of the airplane $dE_{av}$ makes it possible to predict the abscissa $X_{stop}$ of the stopping point $M_{stop}$ of the airplane 1 on the runway 2.

While the airplane is descending to the start of the start point $P_1$, the calculation of the abscissa $X_{stop}$ of the estimated stopping point $M_{stop}$ is preferably updated according to the equation (6), such that, at each instant, the value of this abscissa $X_{stop}$ is updated according to the real trends of the flight parameters of the airplane.

In the leveling-off phase, that is when the height $H_{av}$ of the airplane is less than the reference height $H_1$, the first step of the method consists in determining the abscissa $X_{stop}$ of the estimated stopping point $M_{stop}$ of the airplane 1 on the runway 2 based on a projection of the path 6 of the airplane 1.

Initially, an abscissa $X_2$ of a theoretical point $P_2$ of impact of the airplane 1 on the runway 2 is determined, starting from the assumption that, at each instant, a slope of the path, at the point $P_{av}$, followed by the airplane 1 is constant until touchdown on the runway 2. Said slope of the path is defined by the tangent to the path at the point $P_{av}$. As the airplane 1 approaches the runway 2, the abscissa $X_2$ of the theoretical point of impact $P_2$ will converge towards an abscissa $X_T$ of a touchdown point $P_T$. The abscissa $X_2$ of the theoretical point of impact $P_2$ is determined from a point $P_{av}$ of said path 6 of the airplane, based on the height $H_{av}$ and the abscissa $X_{av}$ of said point $P_{av}$, and a horizontal speed $Vd(P_{av})$ and a vertical speed $Vz(P_{av})$ of the airplane at said point $P_{av}$. In practice, the ratio $$\frac{(Vz(P_{av}))}{(Vd(P_{av}))}$$

represents the height variation according to the variation of distance to the ground, that is, the slope of the path followed by the airplane 1, such that the distance $X_2 - X_{av}$ is equal to the product of the height $H_{av}$ multiplied by the ratio $$\frac{(Vz(P_{av}))}{(Vd(P_{av}))}$$

or $$X_2 - X_{av} = H_{av} \frac{(Vz(P_{av}))}{(Vd(P_{av}))} \quad (7)$$

or $$X_2 = X_{av} + H_{av} \frac{(Vz(P_{av}))}{(Vd(P_{av}))} \quad (8)$$

Knowing the value $X_2$ of the estimated theoretical point of impact $P_2$ of the airplane 1 on the runway 2, the abscissa $X_{stop}$ of the estimated stopping point $M_{stop}$ of the airplane on the runway is determined by adding to said value $X_2$ a taxiing distance $L_r$. Said taxiing distance $L_r$ itself comprises an initial taxiing distance at constant speed and a braking distance $L_f$. The initial taxiing distance corresponds to the distance traveled just after the wheels touch down, before the braking forces are applied, therefore with the speed $V_{av}$ on touchdown during a delay k all-inclusively determined that corresponds in particular to the derotation of the airplane, to the minimum action time of the crew and to the pressure application time in the brakes. The braking distance $L_f$ is advantageously determined from the braking capabilities of the airplane on the runway 2 concerned, assuming a constant deceleration until the airplane 1 stops.

The distance can be given by the performance charts, or calculated by the formula:

$$L_r = L_f + kV_{av} \quad (9)$$

Thus, the abscissa $X_{stop}$ of the possible stopping point $M_{stop}$ of the airplane on the runway is defined by the relation:

$$X_{stop} = X_{av} + H_{av} \frac{Vz}{Vd} + L_r \quad (10)$$

During the descent of the airplane until the wheels of the airplane touch down on the runway, the calculation of the abscissa $X_{stop}$ of the stopping point $M_{stop}$ is preferably updated according to the equation (10), such that, at each instant, the value of this abscissa $X_{stop}$ is updated according to the actual maneuvers of the airplane.

In a second step of the method, the value of the landing delay margin $MRA_{max}$ is determined as the time taken by the airplane 1 to travel, at a speed $V_{touch}$, equal to an estimated speed of the airplane 1 at the moment when the wheels of said airplane touch down on the runway, a distance equal to a distance between the estimated stopping point $M_{stop}$ of abscissa $X_{stop}$, corresponding to the possible stopping point of the airplane closest to the runway threshold 3, and the end 4 of the runway, or:

$$MRA = \frac{(L_{runway} - X_{stop})}{V_{touch}}, \quad (11)$$

where $V_{touch}$ corresponds to a speed of the airplane 1 at the moment when the wheels touch down on the runway at the point $P_T$.

This speed is approximated differently according to the flight phase of the airplane:

when the airplane is in the approach phase, the speed $V_{touch}$ is approximated by the speed $V_1$ that the airplane should reach at the point $P_1$.

when the airplane is in the leveling-off phase, the speed $V_{touch}$ is approximated by the current speed $V_{av}$ of the airplane.

Advantageously, at the point $P_1$, the continuity of the value of the landing delay margin $MRA_{max}$ is provided by an interpolation, which is dependent on the height of the airplane 1, between the landing delay margin $MRA_{max}$ determined during the approach phase and the landing delay margin $MRA_{max}$ determined during the leveling-off phase.

In the exemplary second step described, the estimated landing delay margin value $MRA_{max}$ corresponds to the maximum speed that can be reached by optimum piloting, in particular to obtain a maximum variation of the total energy of the airplane $dE_{av}$. Said landing delay margin $MRA_{max}$ thus makes it possible to know whether the landing and the stopping before the end of the runway 2 can be achieved or not.

In another exemplary implementation of the second step, a current landing delay margin value $MRA_{current}$ is also calculated. Said current landing delay margin $MRA_{current}$ corresponds to a landing delay margin calculated on the basis of the current parameters of the airplane 1 assuming said current parameters to be constant until the landing. The calculation of the current landing delay margin $MRA_{current}$ is updated according to the equation (11), such that, at each instant, the value of said landing delay margin $MRA_{current}$ is updated according to the actual maneuvers of the airplane. The current landing delay margin $MRA_{current}$ thus enables any corrections to be taken into account, for example a compensation of excess energy, to be applied to best converge with the landing delay margin $MRA_{max}$.

In a subsequent step of the method, the values of the landing delay margin $MRA_{max}$ and of the current landing delay margin $MRA_{current}$ are compared to a reference landing delay margin $MRA_{ref}$.

Preferably, the value of $MRA_{ref}$ is determined according to the dispersion, a safety margin and uncertainties concerning the determination of the landing delay margin $MRA_{max}$, notably because of the simplifying hypotheses of the calculations.

Advantageously, when at least one of the calculated landing delay margins $MRA_{max}$ and $MRA_{current}$ is located below the reference landing delay margin $MRA_{ref}$, a visual and/or audible alarm is generated for the attention of the crew.

Advantageously, when the current landing delay margin $MRA_{current}$ is located below the reference landing delay margin $MRA_{ref}$, but the landing delay margin $MRA_{max}$ is located above the reference landing delay margin $MRA_{ref}$, a visual and/or audible alarm is generated for the attention of the crew to warn that the landing of the airplane 1 on the runway 2 is still possible but requires the crew to take an immediate action to correct the current parameters of the airplane 1.

When the landing delay margin $MRA_{max}$ is also located below the reference landing delay margin $MRA_{ref}$, a visual and/or audible alarm is generated for the attention of the crew to warn that it will not be possible for the airplane 1 to stop on the runway 2 in normal conditions of safety.

Figure 3:
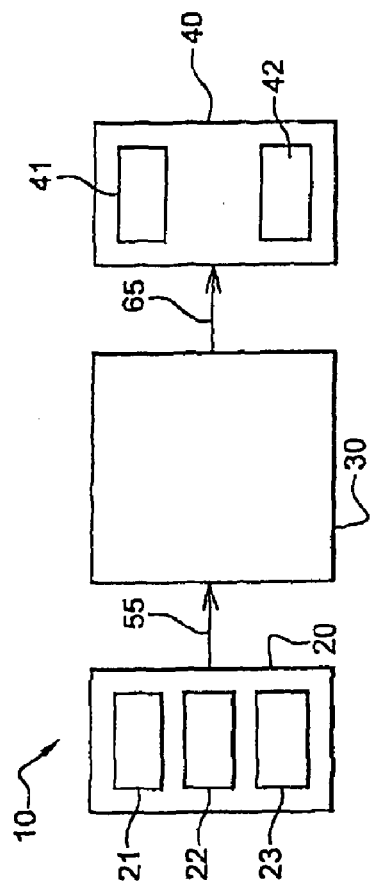

In an exemplary implementation of this method, a device 10 to assist in piloting comprises, as illustrated in FIG. 3:

conventional parameter acquisition means 20 on board an airplane 1 which, in particular, prepare and/or acquire the values of the parameters needed for the method of determining the landing delay margin $MRA_{max}$, computation means 30, linked by a link 55 to the parameter acquisition means 20, and which use the various items of information received from said parameter acquisition means 20 to determine the landing delay margin $MRA_{max}$ corresponding to an estimated delay during which the braking actions must be engaged, after the wheels touch down, to enable the airplane 1 to stop on the runway 2, means 40 of presenting information characterizing the landing delay margin, linked by a link 65 to the computation means 30.

The parameter acquisition means 20 comprise at least:

means 21 comprising data specific to the airplane, such as an airplane database, enabling it to calculate the values specific to the airplane, such as its mass, means 22 comprising data specific to the landing conditions like, for example, the characteristics of the runway, such as the altitude, means 23 of acquiring flight parameters of the airplane, such as, for example, height, speed, wind force and direction, which constitutes information normally accessible on board a modern airplane on communication buses in the form of raw values or processed values (filtered, hybridated, etc.).

In practice, the means 21 and 22 do not necessarily have a database that is specific to them, but are able to query an existing database in other systems, for example a flight management system (FMS) which can transmit raw or processed information based on measured parameters or parameters stored in memory.

The computation means 30 comprise at least one computer, advantageously a computer of the airplane handling other functions, able to calculate the landing delay margin $MRA_{max}$, according to the flight phase of the airplane, based on parameters obtained by the parameter acquisition means 20.

The information presentation means 40 comprise, for example, display means 41, for example a piloting screen already present in the cockpit, which present, for example in graphic form, the landing delay margin $MRA_{max}$ calculated by the means 30. Furthermore, the display means 41 can additionally present the current landing delay margin $MRA_{current}$, also calculated by the means 30.

In a preferred operation of the device, during the approach and leveling-off phases, the landing delay margin $MRA_{max}$ is calculated as a maximum value that can be reached for optimum piloting and the current landing delay margin $MRA_{current}$, corresponding to a landing delay margin calculated on the basis of the current parameters of the airplane 1 assuming said current parameters to be constant until the landing, is updated and displayed permanently according to the current position of the airplane and the landing delay margin $MRA_{max}$.

The crew can thus place itself relative to the landing delay margin $MRA_{max}$ and observe a trend of the current landing delay margin $MRA_{current}$ according to corrective measures applied for convergence with the landing delay margin $MRA_{max}$.

Furthermore, the means 40 comprise alert means 42 which are able to emit an alert signal in the cockpit, in the case where at least one of the two landing delay margins $MRA_{max}$ or $MRA_{current}$ becomes less than the reference landing delay margin $MRA_{ref}$. For example, an alert signal is triggered when the current landing delay margin $MRA_{current}$ is less than the reference landing delay margin $MRA_{ref}$. The crew is thus informed that it is still possible for it to land and stop on the runway if it performs an immediate action to correct the current parameters of the airplane 1. Another alert signal is triggered when the landing delay margin $MRA_{max}$ too is less than the reference landing delay margin $MRA_{ref}$. The crew is thus informed that it will be impossible for it to land and stop before the end 4 of the runway 2 and that, in this case, it must perform a go-around, which can consequently be anticipated and better prepared for the safety of the flight.

The alert means 42 emit, for example, an audible signal, emitted, for example, using a loudspeaker in the cockpit, or a visual signal on an alarm indicator or on a display screen, notably an alert message, signifying, for example, "go-around recommended".

The method and the device according to the disclosed embodiments thus make it possible for the crew to know in advance of a situation in which the airplane would not be able to land and stop before the end of the runway and thus anticipate a go-around which is probably inevitable for safety reasons.

The invention claimed is:

1. A method to assist in the landing of an airplane during an approach phase, maneuvering from a position, called current position $P_{av}$, located at a height $H_{av}$ relative to a reference point, $H_{av}$ being greater than a start-of-leveling-off reference height $H_1$, and with a speed $V_{av}$ along a current approach path toward a threshold of a runway, said runway having an end opposite the threshold on a runway axis (OX), originating at the threshold and positively oriented toward the end, said method comprising the determination of a landing delay margin, called $MRA_{max}$, corresponding to the time taken by the airplane to travel a distance equal to a distance between an estimated stopping point $M_{stop}$ of abscissa $X_{stop}$, corresponding to the possible stopping point of the airplane closest to the runway threshold, and the end of the runway, wherein a speed $V_{touch}$ equal to an estimated speed of the airplane at the time when the wheels of said airplane touch the runway is considered for the determination of the landing delay margin $MRA_{max}$, and in that, at a given flight point, during the approach phase, the abscissa $X_{stop}$ of said stopping point $M_{stop}$ is determined by the estimation of an abscissa $X_1$ of a point $P_1$, corresponding to the point of the current path at which the airplane would be located, with a start-of-leveling-off reference speed $V_1$, when said airplane reaches said height $H_1$, to which abscissa $X_1$ is added a landing distance $L_o$, dependent on the landing conditions but independent of the current flight parameters $H_{av}$ and $V_{av}$.

2. The method according to claim 1, in which the abscissa $X_1$ is determined from the maximum possible total energy variation of the airplane according to the distance traveled by said airplane relative to the ground.

3. The method according to claim 1, in which, during a leveling-off phase, i.e. when the current height $H_{av}$ of the airplane is less than a start-of-leveling-off reference height $H_1$, the abscissa $X_{stop}$ of the stopping point $M_{stop}$ is determined by the estimation of an abscissa $X_2$ of a theoretical point of impact $P_2$ of the airplane on the runway, to which is added a taxiing distance $L_r$ on the runway.

4. The method according to claim 1, in which the delay margin $MRA_{max}$ and a current landing delay margin $MRA_{current}$ corresponding to a landing delay margin calculated on the basis of the current parameters of the airplane assuming said current parameters to be constant until the landing, are compared to a reference landing delay margin $MRA_{ref}$, and in which an alarm is triggered when the current landing delay margin $MRA_{current}$ is less than said reference landing delay margin $MRA_{ref}$ and/or the landing delay margin $MRA_{max}$ is less than said reference landing delay margin $MRA_{ref}$.

5. A device to assist in the landing of an airplane in its final flight phase on a runway, comprising:
   means of acquiring parameters characteristic of an airplane, of the flight and of a landing environment,
   computation means, which determine, from the parameters received from the acquisition means, a landing delay margin $MRA_{max}$, corresponding to an estimated delay during which the braking actions must be undertaken, after the wheels touch down, to enable the airplane to stop on the runway, said landing delay margin $MRA_{max}$ being established according to the method of claim 1,
   means of presenting information characterizing the landing delay margin $MRA_{max}$.

6. The device according to claim 5, in which the computation means also determine a current landing delay margin $MRA_{current}$, representative of a landing delay margin calculated, at each instant, on the basis of the current parameters of the airplane assuming said current parameters to be constant until the landing.

7. An airplane comprising a device according to claim 5.

* * * * *

UNITED STATES PATENT AND TRADEMARK OFFICE
CERTIFICATE OF CORRECTION

PATENT NO.       : 8,165,735 B2
APPLICATION NO.  : 12/062073
DATED            : April 24, 2012
INVENTOR(S)      : Florian Constans It is certified that error appears in the above-identified patent and that said Letters Patent is hereby corrected as shown below:

On the Title page,

Item (75) Inventor: delete "Reidisheim" and insert -- Riedisheim --, therefor.

Signed and Sealed this
Nineteenth Day of June, 2012

David J. Kappos
*Director of the United States Patent and Trademark Office*